United States Patent [19]
Sawyer, Jr.

[11] 3,737,333
[45] June 5, 1973

[54] METHOD FOR PROCESSING KAOLIN CLAY
[75] Inventor: Edgar W. Sawyer, Jr., Edison, N.J.
[73] Assignee: Engelhard Minerals & Chemicals Corporation, Woodbridge, N.J.
[22] Filed: July 21, 1971
[21] Appl. No.: 164,829

[52] U.S. Cl. ................................. 106/288 B, 209/5
[51] Int. Cl. ......................... C09c 3/02, B03d 3/00
[58] Field of Search .................. 209/5; 106/288 B, 106/72; 210/54; 423/118

[56] References Cited
UNITED STATES PATENTS

| | | | |
|---|---|---|---|
| 1,324,958 | 12/1919 | Feldenheimer | 209/5 |
| 3,130,063 | 4/1964 | Millman | 106/288 B |
| 3,346,488 | 10/1967 | Lyons | 106/72 X |
| 3,528,769 | 9/1970 | Lyons | 106/72 X |
| 3,594,203 | 7/1971 | Sawyer et al. | 106/288 B |
| 3,657,134 | 4/1972 | King | 106/72 |

Primary Examiner—Frank W. Lutter
Assistant Examiner—Robert Halper
Attorney—Melvin C. Flint and Inez L. Moselle et al.

[57] ABSTRACT

In the wet processing of kaolin clay, the clay crude is initially deflocculated (dispersed) with a synthetic water-soluble salt having an organic polymeric anion. The deflocculated clay then undergoes further processing, including fractionation, floccing with an agent which must include alum, bleaching, filtration, rinsing and re-deflocculation.

1 Claim, No Drawings

METHOD FOR PROCESSING KAOLIN CLAY

BACKGROUND OF THE INVENTION

My invention is concerned with the wet processing of kaolin clay to provide clay products which form predispersed spray-dried or high solids deflocculated slurried products with exceptionally good stabilities.

In the conventional wet processing of kaolin clay crudes to provide bleached fractions of clays suitable, for example, as paper coating pigments, the clay-water systems involved in the processing undergo conversion from deflocculated condition to a flocculated condition. Eventually the clays are usually re-deflocculated.

Thus, in the initial stages of processing, the crude is deflocculated in water to permit desanding and particle size classification. The fractionated clay is obtained as a deflocculated suspension which must be flocculated before filtration and rinsing. When the clay is bleached, which is usually the case, the deflocculated suspension is generally acidified and flocculated before bleaching. After the bleaching step, the clay is filtered and washed (rinsed). However, the clay product is frequently required to be in deflocculated condition during use. In such a case, the wet processed kaolin clay is usually purchased in the form of a dried (usually spray dried) predispersed product or in the form of a deflocculated concentrated (e.g., 70 percent solids) aqueous slurry. Sometimes the wet processed clay is supplied as an acid clay which is deflocculated during use. In all these cases, suspensions of the clay must be sufficiently fluid for convenient mixing, pumping, unloading and other handling. Gelled or excessively viscous suspensions are invariably unacceptable.

The primary dispersant used commercially to place crude kaolin clays in the initially deflocculated condition is generally sodium silicate or a sodium condensed phosphate salt, e.g., sodium hexametaphosphate. These dispersants are frequently supplemented with soda ash or caustic soda. The flocculants are generally sulfuric acid or alum. The secondary dispersant i.e., the reagent used to re-deflocculate the clay, must be a powerful reagent. Usually a sodium condensed phosphate salt such as sodium tripolyphosphate or tetrasodium pyrophosphate (TSPP) is employed.

Aqueous dispersions of clay which are deflocculated with condensed phosphate salts are generally lacking in viscosity stability because of the tendency of the condensed phosphate salts to hydrolyze and form phosphate compounds which are ineffective deflocculants for fine clays. This tendency is especially pronounced in warm climates, particularly when the deflocculated system is mildly agitated. Reversion of the dispersant is evidenced by thickening or gelation of the system. Thus, deflocculated high solids suspensions of kaolin coating pigments are especially prone to thicken or gel during shipment in tank cars when the weather is warm or hot. Under these conditions, commercial shipments of high solids polyphosphate deflocculated suspensions may form semisolid masses with cannot be unloaded from tank cars.

PRIOR ART

To increase the useful life of high solids phosphate deflocculated clay-water suspensions, the suggestions have been made to incorporate various anionic polymers, including polycarboxylates, polyphosphonates and polysulfonates, into the slurries containing the condensed phosphate dispersants. The supplementary or auxiliary dispersant is incorporated with kaolin clay which has previously undergone wet processing.

When carrying out such procedures, the primary dispersant no longer functions to improve the properties of the end product. In fact, the primary dispersant may be converted during wet processing into a material which has a detrimental effect on the storage stability of high solids slurries of re-deflocculated clay. For example, when sodium silicate is used as the primary dispersant for the crude clay and sulfuric acid is used to flocculate the clay during processing, freshly precipitated hydrated silica coats the surfaces of the clay particles. Similarly, aluminum phosphate precipitates and coats the surface of the clay particles when sodium hexametaphosphate or other condensed phosphate is used as the primary dispersant and alum is employed as the flocculant. These surface coatings undesirably affect colloidal and other properties of the clay in subsequent use. Thus, when sodium silicate is employed as the primary dispersant and sulfuric acid is used to flocculate the suspension, the stability of a high solids slurry of kaolin deflocculated with tetrasodium pyrophosphate is poorer than it would be if alum were employed for floccing.

On the other hand, when a condensed phosphate salt such as Calgon is used as the primary dispersant and mineral acid is employed for floccing, the condensed phosphate tends to revert to an orthophosphate, which is an ineffective clay dispersant. Any condensed phosphate salt in the re-deflocculated clay and derived from the primary dispersant will be no more effective than a subsequently added condensed phosphate salt would be in providing viscosity stable suspensions. This is attributable to the inherent instability of phosphate-deflocculated clay-water systems.

The suggestion has also been made to dispense with the use of condensed phosphate salts to re-deflocculate wet processed kaolin clay and to utilize organic polymeric compounds such as sodium polyacrylates or certain polyphosphonate salts to re-deflocculate wet processed kaolin clay. Generally the organic polymers are more expensive than the condensed phosphates and, even when they are employed in this manner, the primary dispersant used during previous processing serves no beneficial function in the end product.

THE INVENTION

An object of the invention is to provide a method for wet processing kaolin clay whereby the primary dispersant is retained on the clay through subsequent flocculation, bleaching, filtering and rinsing, with the result that the primary dispersant functions in conjunction with any dispersant subsequently added to provide predispersed spray-dried or slurried products with exceptionally good stabilities.

The essence of my invention resides in the use of a relatively low molecular weight, synthetic, water-soluble salt having an organic polymeric anion at alkaline pH to defloccuate crude kaolin clay as a first step in the wet processing of the clay. An essential step in the subsequent wet processing resides in the use of aluminum sulfate to flocculate the clay suspensions previously deflocculated with the polymeric salt. The flocced clay is normally bleached and then it is filtered and rinsed. Before or during use the wet processed clay is usually re-deflocculated by further addition of dispersant.

Slurries of re-deflocculated kaolin clay which have been wet processed in accordance with this invention generally exhibit markedly better viscosity stability than products obtained with the conventional primary dispersants when either alum or mineral acid is used for floccing.

While not wishing to be bound by any theory, the marked superiority of alum over mineral acid as a flocculant for clay processed with the polymeric salts may be explained as follows. I postulate that mineral acid insolubilizes only a portion of the polymer, leaving a remainder which is rinsed away from the clay during subsequent processing. The solubilization is especially pronounced in the case of polysulfonate and polyphosphonate dispersants. Only this remaining portion is available in dispersant-effective salt form when the clay is subsequently dispersed and neutralized. On the other hand, alum not only temporarily insolubilizes most of the polymers but it links the polymer to the kaolin surface, assuring retention during further processing. When the aluminum-polymer coated clay is dispersed at a pH of 7 or above with a condensed phosphate salt, the polymer is free to serve as a dispersant and also may serve as a protective colloid (steric stabilization) or as an anchor polymer.

DESCRIPTION

Organic dispersants within the scope of the invention include synthetic water-soluble anionic polymeric polyelectrolytes which have a substantially linear continuous carbon chain derived by the polymerization of aliphatically unsaturated hydrocarbon groups. Examples of water-soluble organic polyelectrolytes derived substantially completely by olefinic polymerization are monovalent cation salts of the following: polymers of unsaturated carboxylic acids, hydrolyzed polymers of methacrylonitrile, copolymers of unsaturated polycarboxylic acids and at least one other monoolefinically unsaturated monomer, hydrolyzed copolymers of unsaturated polycarboxylic acid anhydrides and at least one other mono-olefinic monomer, copolymers of the partial alkyl esters of unsaturated polycarboxylic acids and at least one other mono-olefinic monomer, copolymers of unsaturated dicarboxylic acid anhydrides and at least one other mono-olefinic monomer, sulfonated polymers of hydrocarbons containing aliphatic unsaturation, and polymers of amides containing aliphatic unsaturation, the aforementioned salts having molecular weights within the range of 500 to 4,000. Also within the scope of the invention are monovalent cation salts of naphthalene sulfonate-formaldehyde condensates having molecular weights within the range of 1,000 to 3,000.

In putting my invention into practice, crushed clay crude is blunged in water in conventional manner. Normally the clay is blunged at about 15 percent to 25 percent solids. The water-soluble salt having an organic polymeric anion is added with agitation to the clay-water system. Typically, the organic dispersant is employed in amount within the range of 0.02 percent to 0.2 percent, based on the weight of the clay. The polymer may be added in acid form to the blunged clay which may be alkalized, if necessary, to a pH above 6, preferably 7 or above, before or after addition of the polymeric acid. Alternatively the polymer may be added in salt form. In this case pH is adjusted to a value within the range above mentioned before or after the polymeric salt is added. For reasons of economy the use of the polymer in the form of a sodium salt (preformed or formed in situ) is preferred. Ammonium, lithium and potassium salts of the polymers may be employed.

The polymeric dispersants presently preferred for reasons of economy and availability and efficacy are monovalent cation salts of polyacrylic acid or polymethacrylic acid, the salts having molecular weights within the range of 1,000 to 4,000 and sodium naphthalene sulfonate-formaldehyde condensates having molecular weights within the range of 1,000 to 3,000.

After addition of the primary dispersant (the organic polymeric polyelectrolyte) the clay is wet processed in conventional manner. This normally includes the steps of degritting, particle size fractionation and flocculation which must be carried out with alum (alone or in combination with strong mineral acid). The quantity of alum that is used is generally within the range of 8 to 20 lbs. per ton of clay. To improve the bleachability of the clay, it may be desirable to reduce the pH of the alum flocculated suspension by addition of mineral acid until pH is within the range of about 2.5 to 3.5.

It is also within the scope of the invention to flocculate the clay by the combined actions of alum and mineral acid, added in any sequence or simultaneously. The use of at least 8 lbs. per ton alum is recommended in such case in order to assure retention of the polymer during processing.

The flocculated clay is usually thickened by partial removal of water from the clay flocs, bleached at a pH below 4 with sodium hydrosulfite or zinc hydrosulfite, filtered and rinsed with water. Bleaching may be omitted with some clays.

The filtered, washed clay may be supplied as an acid clay for subsequent reflocculation by the user. Alternatively, the washed clay may be deflocculated at about 50 percent to 60 percent solids by addition of a deflocculant, normally a condensed phosphate salt alone or together with soda ash or caustic soda to adjust pH to a value within the range of 6 to 8. The fluidized filter cake is dried, usually by spray drying, to provide a dry predispersed clay product for shipment. Improved high solids slurries of the wet processed clay (e.g., slurries containing 65 percent to 75 percent clay solids) may be obtained by treating the acid-filter cake in known manner, described hereinafter in illustrative examples. Germicides and sequestrants may also be incorporated with the predispersed dry or slurry products.

Many users of refined clay prefer or require the condensed phosphate salt dispersants in their formulations. Furthermore, the beneficial results realized by the practice of the present invention are especially noteworthy when condensed phosphate salts are used to re-deflocculate the wet processed clay. Normally, the polyphosphate salt is employed in amount within the range of 0.2 percent to 0.4 percent, based on the dry weight of the clay. However, it is within the scope of the invention to employ powerful clay deflocculants other than condensed phosphate salts to re-deflocculate the clay. Examples are sodium citrate, sodium polyacrylate, sodium polymethacrylate and alkylenedisphosphonic acid salts such as sodium salts of hydroxy ethylidenedisphosphonic acid. Irrespective of the dispersant employed to re-deflocculate the wet processed clay, a smaller amount of dispersant is generally required to re-deflocculate the clay to form a slurry of minimum viscosity, as compared to the amount which would be required when wet processing the same clay with conventional primary dispersants.

EXAMPLES

In these examples, the starting clay was a Georgia soft clay crude from a mine in Washington County, Ga. This crude contained about 20 percent by weight free moisture and is typical of clay ore used as the source of wet processed No. 1 grade kaolin coating clay meeting specifications for "regular" viscosity products.

The objective of the processing was to provide a bleached fine size fraction of clay meeting No. 1 specifications and having a stable apparent viscosity (Brookfield, 10 r.p.m. with No. 3 spindle) below 500 cp. for as long a time as possible and also having acceptable Brookfield 100 r.p.m. and Hercules (high shear) viscosities.

In accordance with the present invention, crude kaolin clay (22.10 lbs.) was blunged for 30 minutes in 33.15 lbs. deionized water in a Cowles agitator. The pH of the slurry was 5.6. To deflocculate the slurry, "D--Floc 70" (33 percent solution of sodium polyacrylate, molecular weight about 1,000) was added in amount of 0.10 percent, based on the calculated moisture-free weight of the clay (17.68 lbs.). After addition of the primary dispersant the mixer was operated for 30 minutes. The resulting slurry had a pH of 5.8 and was too viscous for degritting and fractionation. A 10 percent solution of sodium hydroxide was added with mixing to increase pH to 7.5, thereby thinning the slurry. The agitation was terminated and the slurry was allowed to settle for 10 minutes. The slurry was decanted from the settled matter (principally nondispersed lumps of clay) and the suspension was passed through a 325 mesh (Tyler) vibrating screen to eliminate grit (sand). The degritted slurry was then transferred to a Bird centrifuge which was operated to produce as an overflow a deflocculated suspension of a fine size fraction of the crude clay, the fine clay being at least 90 percent finer than 2 microns (equivalent spherical diameter).

The suspension of fine kaolin clay was split into two portions to provide samples which could be flocculated with two different kinds of flocculants. One of these portions was flocced by adding a 20 percent solution of sulfuric acid until pH was 2.5 and mixing for 30 minutes. The other portion was flocced by adding a 20 percent alum solution to a pH of 4.3. Both samples of flocced clay were split into two portions. The portions which had been flocced with sulfuric acid were bleached with either 15 lbs./ton sodium hydrosulfite or 15 lbs./ton zinc hydrosulfite at a pH adjusted to about 3 by addition of sulfuric acid. The portions of clay which had been flocced with alum were bleached with 15 lbs./ton sodium or zinc hydrosulfite at a pH adjusted to about 4.9 by further additions of alum.

The four bleached, flocculated clay slurries were filtered and washed with 2 parts deionized water to 1 part by volume clay. Cake resistivities (wet) were in the range of 12,000 to 14,000 ohm-cm.

Following the procedure described in U.S. Pat. No. 3,594,203 to Sawyer, Jr. et al., issued July 20, 1971, the cakes were made down into 55.0 percent solids aqueous slurries containing tetrasodium pyrophosphate in amount of 0.30 percent based on the weight of the dried clay. Sodium hydroxide was added to adjust pH to 7.0. The slurries were separately spray dried in a Niro spray dryer to form four batches of predispersed microspheres.

The spray dried microspheres were separately formed into 70.0 percent solids slurries by the makedown procedure described in the patent to Sawyer et al. Viscosity stability of the four slurries was determined by measuring the Brookfield and Hercules viscosities of the slurries after they had aged overnight (initial viscosities) and after they had aged for various periods of time at 130° F. Viscosity measurements, aging procedures used are described in detail in the aforementioned patent to Sawyer et al.

Still in accordance with the invention, the procedures above described were repeated substituting for the "D–Floc 70" identical proportions of "Dispex N–40" (40 percent solution sodium polyacrylate — molecular weight 2,000), sodium polymethacrylate (molecular weight 4,000) and Lomar PW (sodium naphthalene sulfonate formaldehyde condensate having a molecular weight of about 1,000). After addition of the polymeric salts, the pH of each slurry was adjusted to 7.5. The slurry was then screened, fractionated, flocced, bleached, etc.

For purposes of comparison, conventional wet processing was carried out using sodium silicate solution as the primary dispersant. The sodium silicate ("O") was added as a 5 percent solution in amount of 0.10 percent "O" based on the moisture-free weight of the clay. After addition of the sodium silicate solution, pH was 6.7. Desanding and fractionation of the deflocculated suspension of crude clay was carried out at this pH.

Salient results are summarized in table form, such results including Brookfield viscosity values (10 r.p.m., No. 3 spindle) for the 70 percent slurries as initially produced and the periods (weeks) during which the slurries could be maintained at 130° F. before the Brookfield values increased to values of 1,000 cp. or more. In the cause of slurries which retained apparent viscosities below 1,000 cp. during the test period indicated, the Brookfield viscosity values after the expiration of the test period are reported in the table. Since all of the slurries had satisfactory Brookfield 100 r.p.m. and Hercules viscosities, these values are not included in the table.

Data in the table show that the various combinations of primary dispersants, flocculating agents and bleach reagents, including those of the prior art, resulted in wet processed kaolin clay products which could be prepared into 70 percent solids deflocculated (TSPP) slurries having the desired initial apparent viscosity below 500 cp. However, when sodium silicate was used as the primary dispersant and acid was employed for floccing, the slurries thickened to a viscosity in excess of 1,000 cp. after being stored for one week. When sodium silicate was used with alum rather than acid, the slurries were stable for only one additional week.

Data in the table for slurries obtained from clay processed with various anionic polyelectrolytes as the primary dispersants show that, irrespective of the flocculant and bleach reagent employed, the slurries were stable at elevated temperatures for longer periods of time than when sodium silicate had been used as the primary dispersant and either alum or acid was used for floccing. However, a comparison of the results for acid and alum floccing of slurries dispersed with various polymeric polyanionic salts show that results with alum were markedly superior since the viscosity of wet processed clay obtained with alum floccing was essentially constant after aging for periods of time which resulted in thickening when acid was employed. For example, data for polyacrylates and the polymethacrylate and alum flocculant show that after 5 or 6 weeks' aging at to those realized with mineral acid as the flocculant with both sodium silicate and the polymeric polyanionic salts. However, the improvements in viscosity stability when alum was used with the synthetic organic polyelectrolytes were significantly greater than the improvement realized with this floccing agent employed with sodium silicate.

EFFECT OF PRIMARY DISPERSANT AND FLOCCULANT ON VISCOSITY STABILITY OF 70 PERCENT SOLIDS DEFLOCCULATED (TSPP) SLURRIES OF WET PROCESSED KOALIN CLAY

| Wet processing variables | | | Viscosity[1] stability | | |
|---|---|---|---|---|---|
| Primary dispersant | Flocculant | Hydrosulfite bleach | Initial viscosity, cp.[1] | Time for viscosity[1] to exceed 1,000 cp., weeks | Viscosity[1] after weeks indicated, cp./weeks |
| Na polyacrylate (M.W. 1,000) | H₂SO₄ | Na | 320 | 4 | 2,000/4 |
|  | H₂SO₄ | Zn | 320 | 5 | 2,000/5 |
|  | Alum | Na | 230 |  | 240/6 |
|  | do | Zn | 260 |  | 250/6 |
| Na polyacrylate (M.W. 2,000) | H₂SO₄ | Na | 320 | 3 | 2,000/3 |
|  | H₂SO₄ | Zn | 290 | 3 | 2,000/3 |
|  | Alum | Na | 270 |  | 290/6 |
|  | do | Zn | 270 |  | 300/6 |
| Na polymethacrylate (M.W. 4,000) | H₂SO₄ | Na | 350 | 5 | 1,500/5 |
|  | H₂SO₄ | Zn | 350 | 5 | 1,500/5 |
|  | Alum | Na | 375 |  | 500/5 |
|  | do | Zn | 350 |  | 390/5 |
| Sodium naphthalene sulfonate formaldehyde (M.W. 1,000) | H₂SO₄ | Na | 390 | 2 | 3,000/2 |
|  | H₂SO₄ | Zn | 370 | 2 | 2,000/2 |
|  | Alum | Na | 350 | 4 | 1,000/4 |
|  | do | Zn | 320 | 4 | 1,500/4 |
| Sodium silicate | H₂SO₄ | Na | 330 | 1 | 2,000/1 |
|  | H₂SO₄ | Zn | 300 | 1 | 5,000/1 |
|  | Alum | Na | 300 | 2 | 1,000/2 |
|  | do | Zn | 300 | 2 | 4,000/2 |

[1] Brookfield viscosity = 10 r.p.m., No. 3 spindle.

elevated temperature, the high solids slurries were essentially unchanged in viscosity. Thus, for example, when sodium polyacrylate (m. w. 2,000) was used as the primary dispersant and alum was used for floccing with sodium hydrosulfite bleach, the initial viscosity was 270 cp. After aging for 6 weeks at 130° F., the viscosity of the slurry was only 290 cp. However, when the polyacrylates and polymethacrylate were used with sulfuric acid as the flocculant, the slurries had viscosities in excess of 1,000 cp. after or before such aging periods. In the case of sodium naphthalene sulfonate formaldehyde, the slurries had thickened to values in excess of 1,000 cp. after 2 weeks when acid was used as the flocculant whereas the viscosities did not reach or exceed 1,000 cp. until 4 weeks when alum was employed.

The data in the table therefore show that various low molecular weight synthetic polymeric polyanionic salts produced more stable re-deflocculated 70 percent slurries of wet processed kaolin clay than did sodium silicate and that alum produced results markedly superior

I claim:
1. In the wet processing of kaolin clay by steps which comprise mixing crude kaolin clay in water in the presence of a primary clay dispersant to form a deflocculated clay slurry, removing coarse particles therefrom so as to obtain a fine size fraction of clay in the form of a deflocculated suspension, flocculating said deflocculated suspension by adding an acidic substance, filtering the flocced clay, washing the resulting filter cake and re-deflocculating the washed clay at a pH of 7 or above with a condensed phosphate salt to form a high solids fluid aqueous slurry of fine clay, the improvement which comprises utilizing a sodium naphthalene sulfonate formaldehyde condensate having a molecular weight within the range of 1,000 to 3,000 as the primary dispersant at an alkaline pH and employing aluminum sulfate as the acidic substance to flocculate the suspension which was deflocculated with said primary dispersant.

* * * * *